United States Patent Office 3,432,284
Patented Mar. 11, 1969

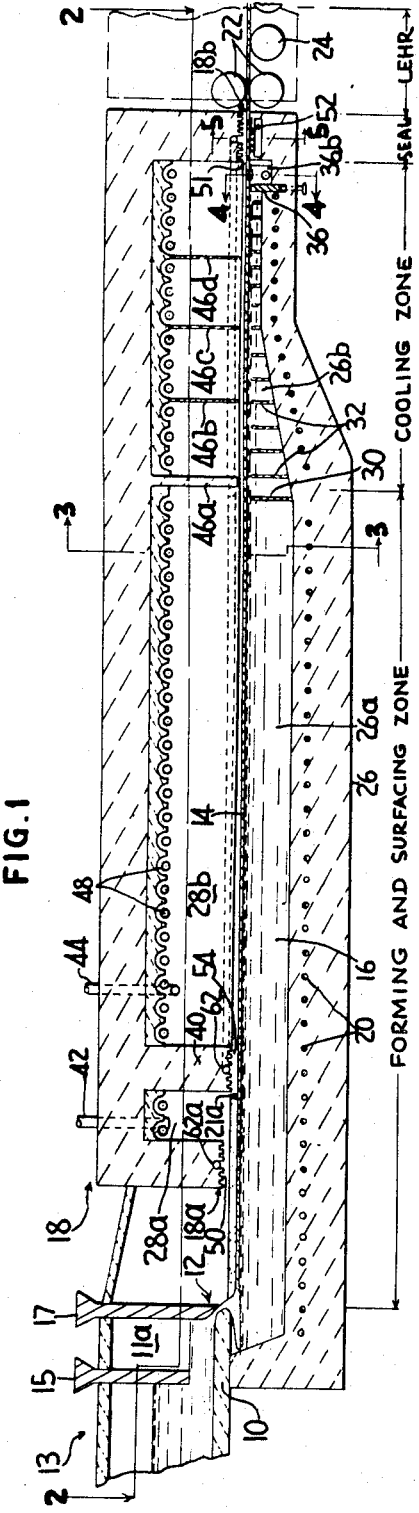

3,432,284
MANUFACTURE OF FLOAT GLASS OF A THICKNESS GREATER THAN EQUILIBRIUM THICKNESS
Joseph A. Gulotta, New Kensington, Pa., assignor to PPG Industries, Inc., a corporation of Pennsylvania
Original application July 1, 1963, Ser. No. 291,816, which is a continuation-in-part of application Ser. No. 265,728, Mar. 18, 1963. Divided and this application Apr. 10, 1967, Ser. No. 629,458
U.S. Cl. 65—99     1 Claim
Int. Cl. C03b 18/00

ABSTRACT OF THE DISCLOSURE

Glass is continuously fed onto the surface of a molten bath which is heavier than the glass and is constrained to restrict lateral flow thereof. Sufficient glass is fed onto the bath to form a layer of substantially uniform width and a substantially uniform thickness which is thicker than the equilibrium thickness obtainable when the glass is permitted to flow laterally unhindered. The layer is cooled for removal from the bath.

---

This application is a division of my copending application Ser. No. 291,816, filed July 1, 1963, now abandoned, which in turn is continuation-in-part of my application Ser. No. 265,728, filed Mar. 18, 1963, copending with Ser. No. 291,816, and now abandoned.

This application relates to the manufacture of flat glass by floating glass on a liquid bath, such as molten metal, so that the resultant flat glass has fire-finished surfaces requiring little or no additional surfacing for ultimate use.

It has been proposed heretofore to produce flat glass by floating a ribbon or sheet of glass upon the surface of a bath of molten metal.

When producing float glass of composition approaching that of commercial plate and window glass or similar soda-lime glasses and using a molten metal such as a bath of tin or tin alloy, molten glass poured directly onto the bath of metal and freely floating thereon ultimately will attain equilibrium at a thickness called "equilibrium thickness." The exact thickness attained by the glass at equilibrium depends upon the composition of the glass and the metal bath. For soda-lime glass and a tin or predominantly tin bath, the equilibrium thickness of a freely floating layer of glass is about 0.27 inch. Even a preformed ribbon of glass of a thickness different from the equilibrium thickness when remelted while supported on the molten metal, will nevertheless seek the equilibrium thickness.

Ribbons or layers of glass thinner than the equilibrium thickness may be obtained by attenuating an equilibrium thickness ribbon, as by applying a downstream tractive force to an already stable portion of the continuous ribbon. A ribbon of a thickness different from the desired equilibrium thickness can also be produced by other methods, for example, that described in the copending applications of Edmund R. Michalik, Ser. No. 188,664, filed Apr. 19, 1962, and Ser. No. 251,682, filed Jan. 15, 1963, by selectively applying over the floating glass or a portion thereof a fluid pressure that is different from the fluid pressure applied to the surface of metal not covered by the glass, and as disclosed in the copending application of William F. Galey, Ser. No. 251,541, filed Jan. 15, 1963, where the central portion of a layer of molten glass may be supported at a different level than the marginal edge portions thereof.

Conveniently, a continuous layer or ribbon of floating glass may be formed by depositing the molten layer of glass directly upon the molten bath of tin from a spout extending from the glass melting tank. As a relatively thick but narrow molten layer of glass is deposited upon the tin bath, the edges of the molten layer naturally spread on the bath, due to the high temperature of the glass and the bath, to form a buoyant body of molten glass of wider dimensions and of a stable thickness.

According to this invention, molten glass is deposited at a controlled rate directly upon the metal bath while the glass is essentially in a flowable state, i.e., in the temperature range of about 1700 to 2200 degrees Fahrenheit. The issued glass is confined upon the molten metal bath between inner surfaces of side walls inert to the glass, and the glass is withdrawn from between the confining side walls at a controlled rate to define the width and thickness of the layer while it is in contact with the walls. The layer is removed from contact with the side walls while the glass is still flowable, i.e., preferably at a temperature above 1700 degrees Farhenheit in the case of soda-lime glass and rarely below 1500 degrees Fahrenheit, so as to facilitate subsequent surfacing without the necessity of reheating the glass.

Most advantageously, the side walls at the surface of the metal bath which serve to confine the molten glass diverge in the direction of ribbon travel from the width of the deposited layer to the ultimately desired width of the ribbon. The refractory walls are constructed of a material readily wettable by molten glass, and the walls preferably include, at the terminal portions downstream from a glass deposing spout, a refractory portion nonwettable by molten glass. The rate of issuance of glass from the spout to the bath between the diverging walls and the angle at which the walls diverge, as well as the rate at which the glass is advanced along the metal bath and hence removed from between the diverging walls, are correlated to produce the desired ribbon.

The glass at the terminal ends of the restricting walls may be prevented from spreading laterally and held at the desired thickness and width attained at the terminal portions of the walls.

An important advantage achieved with the present invention is the manner in which the precise location and width of the molten layer may be controlled, so as to facilitate subsequent operations. Due to the wide anchor provided for the floating layer of glass by the wetted walls, any tendency of the ribbon to move laterally of the bath is diminished.

Other attendant advantages of this invention and the various embodiments thereof will be readily appreciated as the same become better understood by reference to the following detailed description when considered in connection with the accompanying drawings in which:

FIG. 1 is a longitudinal section of an apparatus for producing glass according to the invention process herein contemplated showing means for depositing a layer of glass upon a molten bath and controlling its width, thickness and position upon the bath and showing means for selectively applying a differential pressure to the top of a ribbon of glass supported on a molten metal bath; and FIG. 2 is a horizontal sectional view taken on line 2—2 of FIG. 1 looking in the direction of the arrows.

With particular reference to the drawings, in FIGS. 1 and 2 there is shown a floor or lip 10 which, with side jambs 11a and 11b, forms a spout 12 of generally rectangular cross section at the delivery end of a glass melting furnace 13. Glass issuing from spout 12 forms a layer of molten glass 14 upon the surface of a bath of molten metal 16 contained within a tank 18. The metal may be tin, an alloy of tin, or the like. A glass flow regulating tweel 15 and gate 17, each adjustably suspended in a known manner, cooperate with the spout 12 and control the flow of glass from the furnace 13 to the molten metal bath 16.

Refractory side walls 19a and 19b are located just beneath spout 12 and extend from the spout 12 along, in contact with, and above the surface of the metal bath 16. Preferably, they also extend below the surface of the metal bath. They are suitably supported in position, as from the walls of tank 18 and by hangers, not shown, or they may be otherwise anchored to the tank structure. Side walls 19a and 19b diverge in the direction of glass travel, i.e., from the spout toward the far end of tank 18, from a width approximately equal to the space between side jambs 11a and 11b to a width corresponding to the desired ribbon width. Preferably, the side walls 19a and 19b are constructed of conventional refractory material, such as fired clay block, normally used for glass tank construction and are wettable by molten glass. At the downstream terminal end of each side wall 19a and 19b is a refractory insert 21a and 21b, respectively, of a material such as graphite that is nonwettable by molten glass and which facilitates freeing the molten layer of floating glass 14 from contact with side walls 19a and 19b.

In order to maintain the metal of the bath 16 in molten condition, thermal regulating means, such as electrodes 20 may be located in the floor of the tank 18, as illustrated, or may be submerged within the molten metal so as to affect the temperature of the bath. The electrodes 20 are connected to a suitable source of power (not shown) in a conventional manner. Each electrode may be individually energized and controlled, so as to provide a desired thermal gradient within the various sections of the tank 18, as will be described. The glass ribbon 14, after treatment within the tank 18, is withdrawn from the tank without injury to its surfaces by traction or pinch rolls 22 onto a roller conveyor 24.

The tank 18 is constructed of a refractory bottom portion 26 and a refractory top portion 28, joined and sealed together, except for an entrance 18a and an exit 18b. The bottom portion 26 contains the molten metal 16 and is subdivided into a forming and surfacing zone 26a and a cooling zone 26b. These zones are separated by a submerged baffle 30 to materially reduce convection currents in the molten metal. Other submerged baffles 32 are in the cooling zone to control convection currents in that zone. The level of the metal of the bath is controlled by a level contorl weir 36 at the exit end of the tank and by an inlet (not shown). Preferably, the metal level is always maintained so that the glass ribbon being treated remains free of contact with any submerged wall or baffle within the tank 18. The inlet may be located through a wall of the tank 18 and is connected to a suitable source of molten metal to supply molten metal to the tank 18. The level control arrangement of weir 36 and other details of such control will be later described.

The space within the side and end walls of tank 18 between the top portion 28 and the surface of the metal pool is divided into two chambers 28a and 28b by the front side of a circumferential wall 40. This wall depends from the roof 28 and has its side sections spaced from the walls of tank 18, thereby providing a gas space 28c along each side of the tank. Spaces 28c may, in effect, be continuations or extensions of chamber 28a.

A gas which is inert to the components of the bath, such as nitrogen or the like, is introduced, under pressure, into each gas chamber or pressure zone, through conduits 42 and 44, each connected to a suitable source of the pressurized gas (not shown). The gas is preferably heated so as to eliminate chilling of the zones and the glass being treated. The pressure at which the gas is introduced into the zones 28a and 28c may be different from the pressure of the gas introduced into the zone 28b so as to control the thickness of the floating layer of glass, as will be later described. The pressure zone 28b may be further subdivided by walls or baffles 46a, 46b, 46c and 46d for temperature control purposes.

Radiant heaters 48 are located adjacent the roof of the tank 18 to maintain the desired glass temperature between the exit and entrance ends of the tank. These radiant heaters 48, located in both pressure zones, as illustrated, are connected in a conventional manner to a source of electric power (not shown) and may be individually controlled for temperature gradient control. The control means is any conventional control means and need not be described and shown in detail. If necessary, cooling means can be located above the cooling zone to ensure the proper temperature of the glass being removed from the bath.

Pressure within the zones of the tank above the molten metal is maintained, and the leakage of inert gas from the zones is maintained by the use of fluid pressure seals 50 at the entrance end of the tank, 51 at the exit end of the tank, and by seal 54 associated with the wall 40. The seals 51 and 54 include a plurality of grooves 56 separated by lands suitably supplied with a curtain of inert gas under pressure, as by apertured pipe 62. The upper seal of the entrance seal arrangement 51 is similarly constructed, and inert gas under pressure is supplied through pipe 62a.

A lower seal 52 at the exit end of the tank 18 is constructed to provide a gaseous support for the glass to prevent damage thereto from contact with the tank. As shown in FIG. 1, a plenum chamber 70, connected to a suitable source of inert gas under pressure, supplies gas through orifices 71 to a plurality of grooves separated by lands of a similar construction to the upper seal The level control means for controlling the level of the molten metal in the bath 16 includes the weir 36 and the inlet. The weir 36 is a plate of a refractory material slideable within slots formed in the tank refractory part. The weir is vertically adjustable by suitable means so as to adjust the molten metal level, depending upon the thickness of the glass being produced. The weir defines one side of a trough 36b (FIG. 1), the other side and bottom of the trough being defined by walls of the tank 18 or other suitable refractory material. Conduit 76 passes through the wall of the tank 18 and communicates at one end with the trough 36b. The conduit is connected to discharge molten metal into a sump (not shown) for regeneration and reheating and from which molten metal is pumped to the tank 18 through the inlet 38. The conduit 76 is provided with a trap, i.e., a U-bend in the conduit, so as to prevent the entrance of atmospheric air into the tank 18 which would cause oxidation of the metal of the bath.

OPERATION

In the operation of this device, motlen glass from tank 13 is deposited from spout 12 onto the metal bath 16 between and in contact with diverging walls 19a and 19b. The layer deposited is narrower and thicker than the ultimately desired ribbon. The layer of molten glass spreads across the metal bath between the walls 19a and 19b as the layer advances along the bath from the spout toward the exit end of tank 18.

By virtue of a controlled rate of feed of molten glass from the spout, a controlled rate of advance of the molten layer along the metal bath, the rate at which the side walls 19a and 19b diverge and due to the contact between the glass and the walls, the molten layer of glass reaches a predetermined width and thickness at the terminal ends of walls 19a and 19b. The width is controlled by the diverging walls and, therefore, at a constant throughput of glass, the thickness may be established and controlled by controlling the velocity of the ribbon at the point at which it is released from the walls. Control of this velocity, normally afforded by traction rolls acting upon a stabilized portion of the ribbon downstream of the metal bath, may be facilitated by the use of driven edge knurls (not shown) in contact with the edges of the floating layer of glass intermediate the terminal portions of the diverging side walls and the exit end of the molten metal bath.

At a location intermediate the length of side walls 19a and 19b, the layer of glass 14 passes through the seal 50 at the entrance 18a to the front section 28a of the tank 18. Gas, which is inert to the metal, is fed into pipe 62a and flows downwardly impinging against the glass and thereby isolates the interior of tank 18 from the enclosed area adjacent spout 12. A similar gas is supplied to the plenum chamber 70 under pressure high enough to cause the gas in this chamber to flow through the orifices into the grooves of lower seal 52 and to hold the ribbon away from the solid parts of the tank at the exit end 18b.

In general, this gas is preheated (by means not shown) to a temperature sufficiently high to prevent undue cooling of the glass. Normally, the temperature of the gas supplied to pipe 62a will be about 1000 degrees Fahrenheit and preferably in the range of 1600 degrees to 2000 degrees Fahrenheit. The temperature of the gas supplied to chamber 70 will normally be above 500 degrees Fahrenheit.

Within chamber 28a the glass leaves side walls 19a and 19b at a predetermined width and thickness. The graphite inserts 21a and 21b facilitate the release of molten layer 14 from walls 19a and 19b at the precise location and ribbon width desired. This is further facilitated by the acute angle and sharp intersection formed at the juncture of the inside surfaces of walls 19a and 19b and the end surfaces thereof at the downstream terminal portions of the walls.

As the molten layer of glass leaves side walls 19a and 19b at its predetermined thickness and width, it passes from chamber 28a through the seal 54 beneath circumferential wall 40 into the chamber 28b. As shown in the drawings, the ribbon 14 has a width greater than that enclosed by the wall 40, thus providing a narrow margin which extends beyond the edges of the wall 40 into the chambers 28c.

Sealing gas is delivered to the pipes 62 disposed in the wall 40 and is caused to impinge against the edge portions of the ribbon 14 which is immediately below the walls 40, thereby separating the chamber 28b from 28c by a gaseous curtain. This gas is supplied at a pressure equal to or greater than the pressure established on each side of the curtain. The temperature of the gas supplied to the front section and side sections of these walls in front of baffle 46a generally should approximate a melting temperature of the glass or at least should be high enough so as to avoid cooling the ribbon edges below a melting temperature.

The ribbon 14, while floating on the metal surface, advances through the chamber 28b and finally is withdrawn from the tank 18 passing through the seal 51. It is pulled from the tank between the traction rolls 22 which may, if desired or if necessary, exact enough tension upon the ribbon to keep it moving.

As the ribbon 14 passes through the chamber 28b, the temperature is maintained high enough to facilitate viscous flow of the glass within the forming and surfacing zone of the tank. During this time, the surfaces of the ribbon smooth out and the ribbon seeks an equilibrium thickness, the magnitude of which is dependent upon the pressure differential between chamber 28b and chambers 28c.

Pressure chamber 28b may be used to either maintain the thickness of the molten layer of glass as it issues from between side walls 19a and 19b. The pressure required in the chamber 28b depends upon the thickness desired and the external pressure, i.e., the pressure in the chambers 28c into which the edges of the ribbon or layer extend.

In general, the pressure differential established between the chamber 28b and that at the edge of the sheet or ribbon ranges from 0.01 to 2 ounces per square inch.

Where the thickness of the ribbon as it leaves side walls 19a and 19b is greater than the equilibrium thickness of the glass, this greater thickness may be maintained by varying the pressure differential between chamber 28b and 28c so that the pressure in chamber 28b is less than the pressure in chambers 28c.

The temperature established in the forepart of the chamber 28b is a melting temperature of the glass of the ribbon. Toward the end, i.e., beyond baffle 46a, the temperature is reduced low enough to ensure delivery of a stable ribbon which is not marred by contact with rolls to the discharge end of the tank, for example 600 to 1000 degrees Fahrenheit or below.

It will be understood that the gas discharge through pipes 62 along walls 40 is supplied at a pressure or at a velocity sufficient to maintain the pressure differential between chambers 28b and 28c. As previously explained, the gas, which is discharged in this way beside areas where the ribbon is held at a melting temperature, is heated to a temperature substantially that of the glass. On the other hand, at the farther ends of the chamber, e.g., beyond baffle 46a, the ribbon is cooled and gas supplied to pipes 62 along these portions of walls 40 normally is substantially cooler, rarely above the temperature of the portion of ribbon opposite such wall portions and may advantageously be much lower in temperature.

Example

Molten glass of a temperature of approximately 2100 degrees Fahrenheit is issued at a constant rate from a spout 12 inches wide directly upon a molten metal bath of 100 percent tin having a weight density of 6.52 grams per cubic centimeter at 1800 degrees Fahrenheit. The glass has a composition, by weight, of 71.38 percent $SiO_2$, 13.26 percent $NaO+K_2O$, 11.76 percent CaO, 2.54 percent MgO, 0.75 percent $Na_2SO_4$, 0.15 percent $Al_2O_3$, 0.11 percent $Fe_2O_3$ and 0.06 percent NaCl and a weight density of 2.542 grams per cubic centimeter.

The tank of molten metal is of the construction illustrated in FIGS. 1 and 2 of the drawings and is longitudinally divided into a forming and surfacing zone and a cooling zone. The metal is the forming and surfacing zone is maintained at a temperature of 1900 degrees Fahrenheit. In the cooling zone, the metal temperature ranges from 1900 degrees Fahrenheit to 1000 degrees Fahrenheit in the direction of glass travel. The space above the metal beneath top 28 of tank 18 is subdivided into two pressure chambers and pressurized gas is fed to each chamber. The gas is preheated to 1900 degrees Fahrenheit for this supply. The second chamber 28b is maintained at slightly above atmospheric pressure, i.e., 0.3 ounce per square inch gauge while the first chamber 28b (and also chambers 28c) is maintained at 0.63 ounce per square inch gauge pressure, so that a pressure differential of 0.33 ounce per square inch exists between the two chambers.

Refractory side walls 19a and 19b, wettable by molten glass, are in contact with the surface of the metal bath and diverge from a spacing between the inside or facing surfaces of one foot to an ultimate spacing of three feet and extend along the bath in the direction of glass travel a distance of approximately 8 feet. The downstream terminal ends of the side walls include a two-inch length of graphite.

The layer of glass on the surface of the tin bath 16 and between diverging walls 19a and 19b and in wetting contact with the walls attains a gross thickness of approximately ½ inch across its width at a position adjacent the graphite inserts 21a and 21b at the ends of side walls 19a and 19b. The glass at this point is at a temperature of about 1800 degrees Fahrenheit.

The ribbon or layer then passes beneath chamber 28b. The width of the layer is greater than the width of the second chamber 28b so that the margins of the layer extend laterally beyond the outer side edges of the chamber. By virtue of the pressure differential between chamber 28b and chambers 28c, the central portion of the ribbon beneath chamber 28b is maintained at a thickness of ½ inch.

Radiant heat is added from about the ribbon or layer of glass by heating elements 48 to help maintain the glass at a melting temperature throughout its entire thickness in a section across the entire width of the ribbon under chamber 28b. The ribbon is then cooled at the exit end of the molten metal tank to a temperature of approximately 1000 degrees Fahrenheit, after which it is withdrawn from metal contact. The ribbon thickness remains at substantially ½ inch and the surfaces are fire-finished and flat, except for the edges which are thinner. The ribbon is withdrawn at a speed of approximately 12 inches per minute.

The interior and exterior of the second chamber are separated by a gas curtain, as illustrated in the drawing, wherein the gas is delivered at a pressure of 0.62 ounce per square inch.

VARIATIONS

In connection with the above-described embodiments, it should be understood that, in lieu of molten tin or tin alloy, other stable molten materials having a greater density than the glass of the ribbon may be used in the practice of this invention, including: lead, lead-zinc alloys, lithium or the like and metal salts such as copper chloride, lead chloride, and like materials which have a density above about 2.5 and are stable, essentially non-volatile, liquids at the melting temperature of the glass treated.

While the use of an intermediate gas partition is an effective seal, it will be understood that other means may be resorted to. For example, the lower ends of walls 40 may be disposed so close to the top of the ribbon that substantial leakage does not occur and the desired pressure differential can be maintained.

The width of the ribbon with respect to the pressure chamber may be varied. For example, where thicker sheets are desired the ribbon need not extend beyond the outer edges of the walls 40 since the gap supplied from pipes 62 provides the differential pressure required. In this case the gas supplied in this way can generate a superatmospheric pressure profile at the edges of the ribbon and the chamber 28b can be held at atmospheric pressure.

It will be understood that the use of side walls wettable by molten glass in conjunction with a flow of glass upon a metal bath will facilitate attainment of a given thickness of such a molten glass layer in a shorter distance of travel for a given quantity of glass than either a freely floating layer of glass (i.e., with the marginal edges unconfined). In addition to the above, the present invention contemplates the use of marginal contacting, confining, refractory walls of a material nonwettable by molten glass for the purpose of confining the marginal edges of a molten glass layer to maintain a ribbon thickness in excess of the equilibrium thickness and thereafter to maintain such thickness, as by using a pressure chamber arrangement as disclosed in FIGS. 1 and 2.

It should be understood that the diverging walls, such as walls 19a and 19b, that control the width, thickness and location of the layer of glass need not be constructed in the precise manner disclosed herein to function in accordance with the inventive concept. For example, it is contemplated that the diverging walls extending from the spout of the glass melting tank may be integral with the tank and may even replace, i.e., form, part of the walls of the tank containing the molten metal.

While the foregoing embodiments of this invention have been described primarily in connection with the establishment of a subsequent pressure differential or bilevel bath for maintaining a thickness of width obtained by the flowable layer or ribbon of glass at the release point of the wetted refractory walls, it is also possible to attain dimensional stability through suitable temperature control. Thus, in lieu of a pressure chamber or bilevel bath immediately following the diverging side walls that control width, thickness and location of the glass layer, the temperature of the glass at the release point may be lowered to a point (normally to a temperature above 1400 degrees Fahrenheit and preferably between about 1500 degrees Fahrenheit to 1600 degrees Fahrenheit) where the viscosity of the glass is high enough to prevent substantial changes in ribbon dimensions in the time available and from the forces present, and yet is sufficiently low to permit the release of the ribbon from the walls.

Although the present invention has been described with reference to certain specific details, it is not intended that such details be regarded as limitations upon the scope of the invention, except insofar as is included in the accompanying claim.

I claim:
1. In a method of manufacturing a ribbon of glass in which molten glass is continuously fed onto the surface of a bath of a liquid having a density greater than that of the glass, and in the absence of restraint will flow laterally and ultimately to attain an equilibrium thickness, the glass is advanced along the bath, then cooled and thereafter removed from the bath, the improvement which comprises, feeding molten glass onto the surface of said bath at such a rate that it will normally spread laterally ultimately to attain said equilibrium thickness, restricting the lateral flow of said molten glass during said flow and before the glass attains an equilibrium thickness and continuing to feed molten glass onto the bath until the glass thickness is greater than said equilibrium to produce a ribbon of glass of substantially uniform width and uniform thickness greater than said equilibrium thickness.

discharging the glass from its restriction at said width and thickness, thereafter cooling said ribbon while at said width and thickness greater than equilibrium thickness to fix that width and thickness thereof, and removing the cooled glass ribbon from said bath.

References Cited

UNITED STATES PATENTS

| | | | |
|---|---|---|---|
| 2,276,615 | 3/1942 | Hazelett | 65—91 |
| 2,689,982 | 9/1954 | Chynoweth | 65—99 |
| 3,266,880 | 8/1966 | Pilkington | 65—65 |

DONALL H. SYLVESTER, *Primary Examiner.*

R. V. FISHER, *Assistant Examiner.*

U.S. Cl. X.R.

65—65, 91, 182

PO-1050
(5/69)

UNITED STATES PATENT OFFICE
CERTIFICATE OF CORRECTION

Patent No. 3,432,284            Dated March 11, 1969

Inventor(s) JOSEPH A. GULOTTA

It is certified that error appears in the above-identified patent and that said Letters Patent are hereby corrected as shown below:

In the references cited add United States Patent No.
-- 3,186,813    6/1965    Pfaender    65-91 --.

Column 2, line 27, "deposing" should read -- depositing --;
Column 2, line 39, delete "in-" at the end of the line.
Column 3, line 42, the word "contorl" should read -- control --
Column 6, line 29, "NaO+$K_2$O," should read -- $Na_2O+K_2O$, --.

**SIGNED AND
SEALED
SEP 2 - 1969**

(SEAL)
Attest:

Edward M. Fletcher, Jr.
Attesting Officer

WILLIAM E. SCHUYLER, JR.
Commissioner of Patents